…

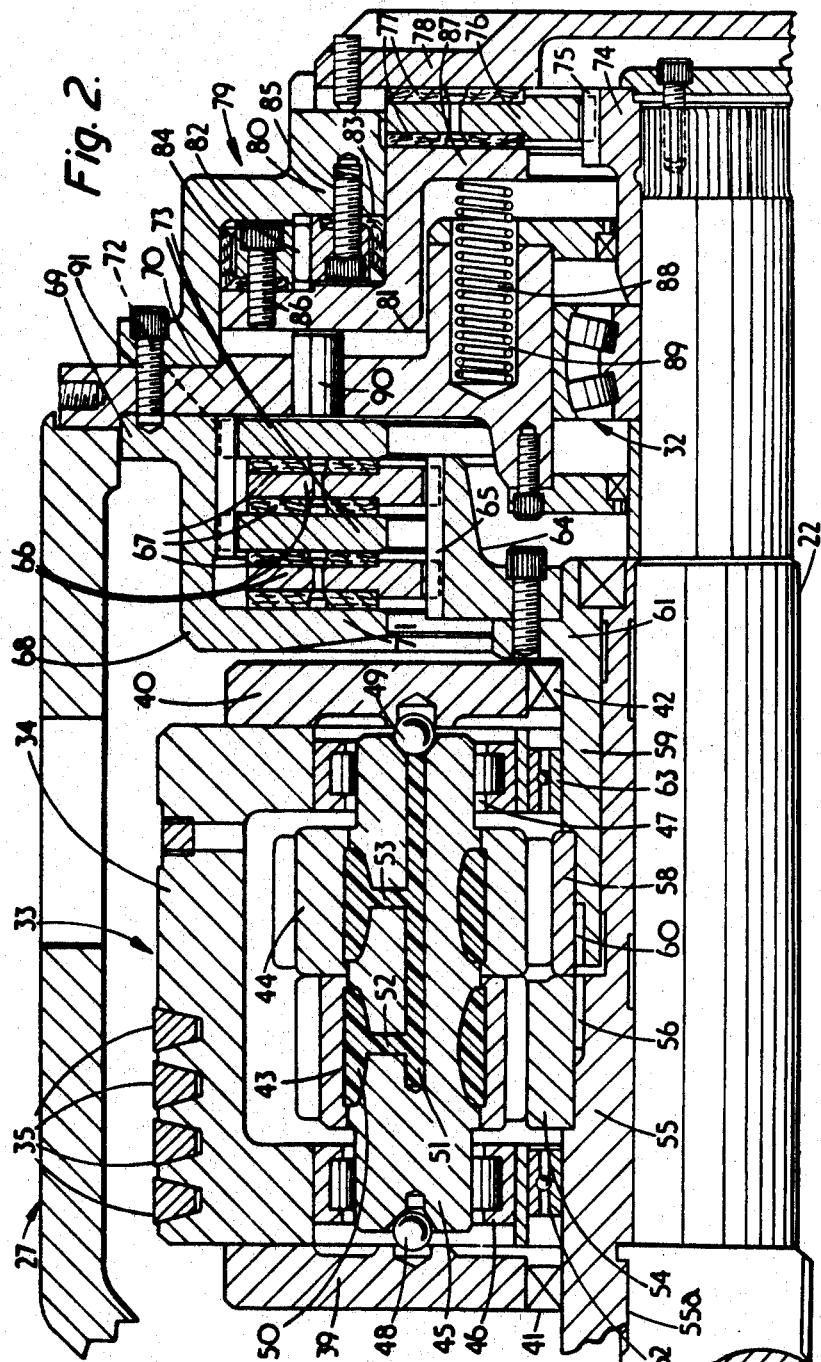

United States Patent Office 3,392,592
Patented July 16, 1968

3,392,592
MECHANISM FOR IMPARTING INTERMITTENT ROTARY MOTION TO A SHAFT
Harry Gerald Swann, Finchfield, Wolverhampton, England, assignor to Samuel Griffiths (Willenhall) Limited, Willenhall, England, a British company
Filed Oct. 25, 1965, Ser. No. 505,178
Claims priority, application Great Britain, Oct. 31, 1964, 44,493/64
6 Claims. (Cl. 74—44)

ABSTRACT OF THE DISCLOSURE

A power transmitting mechanism for transmitting power from drive means to the crankshaft of a power press, which mechanism includes a freely rotatable planet gear carrier driven directly by the driving means and carrying two sets of planet gears, one planet gear of each set being mounted for rotation with one planet gear of the other set, a first sun gear arranged to engage one planet gear set and keyed for rotation with the crankshaft, a second sun gear engaging the second planet gear set and arranged to rotate freely with respect to the crankshaft, and braking means arranged to exert a selective, exclusive braking action either on the crankshaft or on the second sun gear while permitting the planet gear carrier to continue rotating at a constant rate.

---

Figure 1:
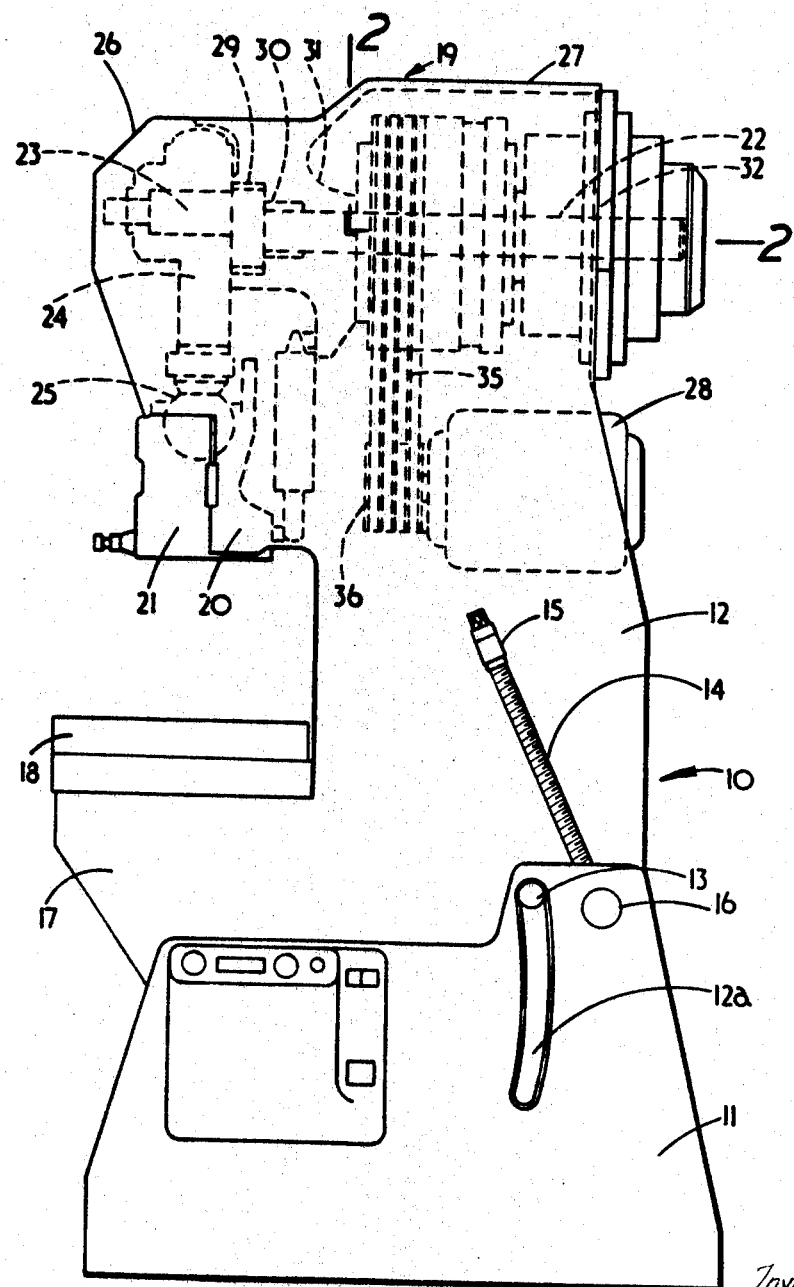

This invention relates to power presses of the kind comprising a body including a bed for supporting one of a pair of cooperating tools, a ram for carrying the other of these tools and guided for movement on the body towards and away from the bed, such ram being driven from a driving shaft having a crank cam or other eccentric element (herein for convenience called the crankshaft), and a motor driven rotary power storage member (herein for convenience called the flywheel) mounted for rotation on the body for imparting the requisite motion to the crankshaft. Such power presses are herein referred to as being of the kind specified.

The object of the present invention is to provide a new or improved mechanism for transmitting the requisite rotation to the crankshaft better adapted to meet operational requirements than conventional presses.

According to the present invention a power press of the kind wherein a reciprocatory ram is driven from a crankshaft itself driven from a motor through the intermediary of a differential gear comprising a rotary planet carrier having two sets of planetary gears meshing with respective sun gears of which one is connected with the crankshaft and the other is connected with a shaft coaxial with the crankshaft is characterised in that rotatable elements of respective brakes are connected with the crankshaft and coaxial shaft and cooperate with nonrotatable elements movable relatively into or out of cooperation therewith under the control of brake actuating means which serve selectively to apply either of the brakes whilst releasing the other so that the crankshaft is either driven or braked as required.

In a preferred arrangement wherein the planet carrier is disposed coaxially with the crankshaft and the latter has an eccentric element for driving the ram, the planet carrier itself is so dimensioned as to have a sufficiently large moment of inertia to serve as a flywheel without the necessity for employing an additional moving mass connected to or integrally formed on planet carrier for this purpose, the planet carrier being disposed between the eccentric element and the brakes and the press including a casing body enclosing the planet carrier and forming a fixture for anchorage of the nonrotatable parts of the brakes.

With this arrangement the moment of inertia of the crankshaft is reduced due to the fact that it carries only one rotatable brake element instead of additionally carrying the driven element of the clutch as in conventional constructions. One of the output elements of the differential gear is, of course, connected to and serves to drive the crankshaft but in the preferred form of gear, namely a planetary gear of the epicyclic type, the moment of inertia of the sun gear concerned can be kept low relatively to that which is inherently involved in a driven clutch element which has to be of substantial diameter in order to present the required surface area to enable the driving torque to be transmitted.

Moreover, the use of the differential gear, besides reducing the moment of inertia of the crankshaft provides a convenient means for establishing a step-down velocity ratio between the flywheel conveniently formed as part of the planet carrier and the crankshaft, thereby enabling a relatively small diameter part to act as a flywheel. Thus, although a speed reducing gear is present it achieves the dual advantage of enabling a lighter flywheel to be used and eliminates problems hitherto encountered with conventional clutches.

The invention will now be described, by way of example, with reference to the accompanying drawings wherein:

FIGURE 1 is a view in side elevation of one construction of press of the kind specified in accordance with the invention; and FIGURE 2 is a fragmentary view in side elevation and in diametral cross-section on the line 2—2 of FIGURE 1.

Referring to FIGURE 1, the body 10 of the press comprises a base 11 upon which is supported an upwardly extending pedestal portion 12 pivotally connected to the base for movement about a transverse horizontal axis concentric with an arcuate slot 12a in the base with which is associated a clamping nut 13 to enable the press to be operated with the bed in a horizontal position, as shown in FIGURE 1, or in a position in which the bed is inclined downwardly from its forward margin towards its rearward margin. A screw-threaded strut 14 connected between a pivotal supporting block 15 on the pedestal portion and a rotatable bush 16 on the base serves positively to hold the pedestal portion in the desired angular relationship to the base. The lower part of the pedestal portion includes a horizontally projecting part 17 on which is mounted the bed 18 and at its upper end the pedestal portion is formed with a head 19 including vertically extending guideways 20 on which are mounted a ram 21 capable of reciprocation towards and away from the bed 18.

Such reciprocation is transmitted to the ram by means of a crankshaft 22, the forward end of which incorporates or carries an eccentric element such as a crank 23 operatively connected with the ram 21 through the intermediary of a connecting rod 24, the lower end of which is equipped with a ball element 25 received in a part-spherical socket in the ram.

The head 19 of the press body is of hollow form and is subdivided into a forward housing 26 which accommodates the forward end portion of the crankshaft and eccentric element, and a rear housing 27 which accommodates the mechanism for transmitting drive from a driving motor 28 to the crankshaft. The drive motor 28 is conveniently mounted between the side members of the pedestal portion 12 beneath the rear housing 27.

The crankshaft is supported at axially spaced positions, on the one hand by bearings 29 and 30 carried by an internal web 31 of the head 19 forming the common wall between the forward and rearward housings, and on the other hand by a bearing 32 supported by the rear wall of the rear housing as hereinafter more fully described.

It will be noted that with this arrangement the crankshaft is supported against bending deflections immediately adjacent to the parts thereof where accelerating and braking torque is required to be transmitted to the crankshaft.

Referring now to FIGURE 2, the mechanism for transmitting the requisite rotation to the crankshaft comprises a different gear 33 of the epicyclic type. This gear includes a planet carrier in the form of a generally cylindrical casing having a circumferential wall 34 of a mass to form an effective flywheel and incorporating externally a plurality of V-shaped grooves for receiving V belts 35 engaging in a corresponding number of grooves of a driving pulley 36 on the shaft of the motor 28.

The planet carrier has end walls 39 and 40 apertured to permit of the passage through the epicyclic gear of the rear portion of the crankshaft 22 and furnished with sealing members 41 and 42 at their inner boundaries.

Two sets of planet gears are supported from, and disposed internally of, planet carrier 33, typically three planet gears being provided in each set at equal angular intervals about the axis of the crankshaft. Two planet gears 43 and 44, one from each set, having different diameters and numbers of teeth respectively are keyed to a common planet shaft 45 supported by roller bearings 46 and 47 in the planet carrier while balls 48 and 49 interposed between bearing recesses in the ends of the shaft 45 and thrust members in the end walls of the planet carrier take any axial thrust.

The planet gears 43 and 44 are keyed to the shaft 45 by keying material 50 preferably of nonmetallic form. Such material may be a synthetic resin having the requisite mechanical strength and capable of being injected into communicating cavities in the shaft 45 and in the planet gears 43 and 44 respectively, which latter may be in the form of axially extending grooves and separated by intervening serrations or ribs, the material being thereafter caused or permitted to harden. For this purpose the shaft 45 is formed with an axial bore 51 and radially extending bores 52 and 53 leading to the communicating cavities in which keying portions of the material are disposed.

A synthetic resin such as nylon provides some degree of elasticity with respect to the transmission of torque between each planet gear 43 and the shaft 45. This factor taken together with ability to inject the keying material whilst the planet gears of each set are brought fully into mesh with their respective sun gears, hereinafter mentioned, ensures that each set of planet gears transmits an equal or approximately equal proportion of the torque load required to be transmitted from the flywheel portion 34 and the crankshaft 22. Further, the dimensions of the keying portions may be made such that should any failure take place it does so by shearing of the keying portions rather than by stripping of the meshing teeth of the planet and sun gears or failure of other parts which are more expensive to replace than the keying material. This form of keying may be applied either to all of the planetary gears of each set or to two out of the three.

One set of planet gears, such as that shown at 43, meshes with a sun gear 54 which in turn is fixedly mounted on an intermediate tubular shaft 55 by means of a key 56, such shaft itself being nonrotatably mounted on the crankshaft by means of interengaging splines on the intermediate shaft and crank shaft as seen at 55a.

The other set of planet gears, such as 44, meshes with a coaxially mounted sun gear 58 which is fixedly mounted on a tubular shaft 59 by means of a key 60, such tubular shaft terminating at its rearward end in an attachment flange 61.

The planet carrier forms the input element of the epicyclic gear and the sun gears 54 and 58 form first and second output elements. The overall reduction ratio afforded between the input element and either of the output elements, when the other of the latter is held stationary, is determined by the difference of the ratio afforded between the planet gear 43 and its companion sun gear 54 on the one hand, and that afforded between the planet gear 44 and its companion sun gear 58 on the other hand. This form of gear enables the overall reduction ratio to be selected from a very wide range without any, or any substantial, alterations in the design and overall size of the gear. Although typically the overall ratio may be either 1:3 or 1:7 or thereabouts, according to whether the press is required to give high speed or low speed operation of the ram (strokes per minute ranging from about 180 to about 60), special requirements as to very high speed or very low speed working can be met by selecting the overall ratio with the range 1:1.8 to 1:272 or thereabouts. The planet carrier, and hence the flywheel portion thereof, is in all cases driven to rotate at a sufficiently high speed to provide the energy required for the working stroke of the press (typically at 500 to 600 r.p.m.) and at the same time enable the diameter of the planet carrier to be kept to compact dimensions. This enables the epicyclic gear to be accommodated in a rear housing of cross-sectional dimensions in a vertical plane extending transversely of the press which do not substantially exceed the overall lateral and vertical dimensions of the press as determined by other parts, such as the base and the forward housing, for accommodating the eccentric element.

The planet carrier is located radially with respect to the tubular shafts 55 and 59 by ball bearings 62 and 63.

To the flange 61 of the tubular shaft 59 is secured a hub 64 which is splined externally as seen at 65 and carries rotatable brake elements in the form of generally annular plates 66 splined internally to cooperate with the splines 65 so as to be slidable therealong and equipped with friction linings 67.

Associated with these rotatable brake elements are fixed brake elements comprising an annular chamber 68 which at its rearward end has an attachment flange 69 secured to the end wall 70 of the rear housing 27 and which at its forward end has a radially inwardly projecting flange 71. Internally the chamber 68 is splined, as indicated at 72, and the outer peripheries of fixed annular plates 73 are shaped to engage slidably with these splines, the plates 73 being interleaved with the plates 66 and their linings.

At its rearward end the crankshaft carries a further movable brake element and for this purpose has secured nonrotatably thereto a hub 74 splined externally at 75 to engage with the appropriately splined inner periphery of rotatable brake plate 76 equipped with linings 77.

The movable brake plate 76 cooperates with a fixed brake plate 78 which is secured to the cylinder of a piston and cylinder assembly 79. The piston and cylinder assembly comprises an outer component 80 of stepped form in cross-section which, in combination with an inner component 81 forming the piston, defines an annular chamber 82, suitable seals 83 and 84 being secured respectively to the cylinder component 80 and piston component 81 by screws 85 and 86.

At its inner periphery the piston component 81 includes a radially projecting flange 87 which acts as a further fixed brake plate in association with a movable plate 76 and which is urged towards the operative position in which the brake is applied by means of a plurality of angularly spaced coiled compression springs 88 accommodated in sockets 89 formed in the end wall 70 of the housing and bearing against the forwardly presented face of the flange.

The outer part of the piston component 81 serves to compress the assembly of movable and fixed brake plates carried by the hub 64 through the intermediary of cylindrical thrust elements 90 slidably mounted in openings in the end wall 70.

In operation the planet carrier is driven continuously from the drive motor by means of the V belts 35, and, preparatory to the start of a complete cycle of operation, the crankshaft is held stationary by operation of the brake comprising the rotatable brake plate 76 and fixed brake plates 78 and 87 under the action of springs 88.

Under these conditions the sun gear 58, tubular shaft 59, hub 64 and movable brake plates 66 rotate freely at a speed less than the rotational speed of the planet carrier as determined by the step-down velocity ratio afforded by the epicyclic gear.

To start the cycle of operation fluid under pressure such as air is fed into the interior of the annular chamber 82 of the piston and cylinder assembly to move the piston component 81 to the left as seen in FIGURE 2. This releases the pressure exerted by the springs 88 and hence releases the crankshaft brake, immediately following which the fixed and movable brake plates moved by the hub 64 become sufficiently compressed to arrest free rotation of the hub 64 and hence the tubular shaft 59 and sun gear 58.

The arrest of the sun gear 58 immediately causes torque to be transmitted to the sun gear 54 and through the intermediary of the tubular shaft 55 to the crankshaft and hence sets the ram of the press in motion.

It will be noted that the inertia load which is one of the limiting factors upon the acceleration which can be achieved is reduced in comparison with conventional presses, in that, instead of having to accelerate the driven element of a clutch keyed or otherwise fixed to the crankshaft, the operation of the present mechanism involves only the stopping of the rotating assembly comprising the sun gear 58, tubular shaft 59, hub 64 and movable brake plates 67. These parts can be made of smaller diameter than the driven element of a clutch of a conventional press.

At the appropriate instant before the end of a complete revolution of the crankshaft the pressure fluid, for example air, is allowed to exhaust from the interior of the piston and cylinder assembly, thereby allowing the springs 88 to apply pressure to the brake associated with the crankshaft, preparatory to which movement of the piston component 81 to the right will already have released compression of the movable brake plates 66 carried by the hub 64 to allow this to rotate freely. Again the inertia load which tends to increase the braking torque required to stop the crankshaft in a given angular displacement is reduced in comparison with conventional presses by elimination of the relatively massive high inertia driven element of the clutch.

The admission of air or other working fluid to the space 82 of the piston and cylinder assembly can be effected through a pipe or duct connected to the cylinder component 80 which is fixed by screws 91 to the end wall 70 of the rear housing.

This end wall also serves as the means for supporting the bearing 32 which may be of the self-aligning type, as shown in FIGURE 2. It will be noted that the crankshaft is supported by the bearing 32 immediately adjacent to the hub 64 which transmits braking torque whilst the tubular shaft 55 which transmits driving torque to the hub is keyed thereto at a position immediately adjacent to the forwardly disposed bearing 30 so that in each case stressing of the crankshaft by torque loading takes place at positions at which the bending deflection of the crankshaft is at a minimum.

What I claim then is:

1. In a power press including a body having a forward portion and a rearward portion, a press bed mounted on said forward portion of said body, a reciprocatory ram, a crankshaft, eccentric means operatively connected with said crankshaft for moving said ram towards and away from said press bed, and driving means, the improvement comprising:
    (a) a differential gear operatively interposed between said driving means and said crankshaft and comprising a rotary planet carrier coaxial with, and mounted for free rotation with respect to, said crankshaft and driven by said driving means, first and second sets of planetary gears mounted on said planet carrier, a first sun gear connected to for rotation with said crankshaft and meshing with said first set of planetary gears, and a second sun gear meshing with said second set of planetary gears and mounted for free rotation with respect to said crankshaft,
    (b) a shaft coaxial with, and mounted for free rotation with respect to, said crankshaft and connected for rotation with said second sun gear,
    (c) first brake means comprising rotatable means connected to said crankshaft for rotation therewith and nonrotatable means carried by said body,
    (d) second brake means comprising rotatable means connected to said coaxial shaft for rotation therewith and nonrotatable means carried by said body, and
    (e) brake actuating means connected to said first and second brake means for selectively actuating only one of said brake means at any given time, said actuating means actuating said first brake means by moving said nonrotatable means and said rotatable means of said first brake means relatively to one another to effectively brake said crankshaft and actuating said second brake means by moving said nonrotatable means and said rotatable means of said second brake means relatively to one another to effectively brake said coaxial shaft.

2. An arrangement as defined in claim 1 wherein said planet carrier defines a flywheel enclosing said first and second sets of planetary gears, said carrier being disposed between said brake means and said eccentric means and being of a radial size just large enough to enclose said planetary gears.

3. An arrangement as defined in claim 2 further comprising front and rear bearing means and wherein said crankshaft extends from the front to the rear of the body and is supported by said front and rear bearing means, said eccentric means is disposed adjacent said front bearing means, said brake means are disposed adjacent said rear bearing means, and said planet carrier being disposed between said front bearing means and said rear bearing means.

4. In a power press including a body having a forward portion and a rearward portion, a press bed mounted on said forward portion of said body, a reciprocatory ram, a crankshaft, eccentric means operatively connected with said crankshaft for moving said ram towards and away from said press bed, and driving means, the improvement comprising:
    (a) a differential gear operatively interposed between said driving means and said crankshaft and comprising a rotary planet carrier driven by said driving means, first and second sets of planetary gears mounted on said planet carrier, a first sun gear connected to said crankshaft and meshing with said first set of planetary gears, and a second sun gear meshing with said second set of planetary gears, said planet carrier being so dimensioned as to have a sufficiently large moment of inertia to serve as a flywheel without the necessity for employing an additional moving mass on said planet carrier;
    (b) a shaft coaxial with said crankshaft and connected to said second sun gear;
    (c) first brake means disposed on the side of said rearward portion of said body remote from said forward portion of said body and comprising rotatable means connected to said crankshaft and nonrotatable means carried by said body;
    (d) second brake means disposed between said rearward portion of said body and said differential gear and comprising rotatable means connected to said coaxial shaft and nonrotatable means carried by said body, said planet carrier being disposed between said eccentric means and both of said brake means; and (e) brake actuating means for alternately moving said nonrotatable means and said rotatable means of said first brake means relatively to one another to effectively brake said crankshaft and moving said nonrotatable means and said rotatable means of said second brake means relatively to one another to effectively brake said coaxial shaft, said actuating means comprising a piston and cylinder assembly mounted on said rearward portion of said body between said first brake means and said second brake means, and thrust transmitting means extending through said rearward portion of said body to transmit movement from said piston and cylinder assembly to said second brake means.

5. A power press as claimed in claim 4 further comprising:
(a) first bearing means for supporting said crankshaft disposed in said forward portion of said body between said eccentric element and said differential gear, and
(b) second bearing means for supporting said crankshaft disposed in said rearward portion of said body at the side of said differential gear remote from said eccentric element.

6. A power press as claimed in claim 4 further comprising means for ensuring approximately equal load sharing between said sets of planetary gears.

References Cited
UNITED STATES PATENTS

| | | | |
|---|---|---|---|
| 1,465,796 | 8/1923 | Twomley | 74—766 |
| 2,535,842 | 12/1950 | Criley | 74—44 |

FRED C. MATTERN, JR., *Primary Examiner.*

W. S. RATLIFF, *Assistant Examiner.*